(12) United States Patent
Decroupet et al.

(10) Patent No.: US 7,745,009 B2
(45) Date of Patent: Jun. 29, 2010

(54) LOW-EMISSIVITY GLAZING

(75) Inventors: Daniel Decroupet, Jumet (BE);
Jean-Michel Depauw, Jumet (BE)

(73) Assignee: AGC Glass Europe, Brussels (BE)

( * ) Notice: Subject to any disclaimer, the term of this patent is extended or adjusted under 35 U.S.C. 154(b) by 188 days.

(21) Appl. No.: 11/908,666

(22) PCT Filed: Mar. 16, 2006

(86) PCT No.: PCT/EP2006/060800

§ 371 (c)(1),
(2), (4) Date: Sep. 14, 2007

(87) PCT Pub. No.: WO2006/097513

PCT Pub. Date: Sep. 21, 2006

(65) Prior Publication Data

US 2009/0004412 A1    Jan. 1, 2009

(30) Foreign Application Priority Data

Mar. 17, 2005  (BE) ................................ 2005/0144

(51) Int. Cl.
*B32B 9/00* (2006.01)
*B32B 15/00* (2006.01)
*E04C 2/54* (2006.01)
*E06B 3/00* (2006.01)
*F21V 9/04* (2006.01)

(52) U.S. Cl. .................. 428/432; 428/34; 428/698; 428/699; 428/701; 428/702; 359/360; 359/585; 52/786.1

(58) Field of Classification Search .................. 428/34, 428/432, 433, 698, 699, 701, 702; 359/359, 359/360, 361, 580, 585, 586, 589; 52/786.1
See application file for complete search history.

(56) References Cited

U.S. PATENT DOCUMENTS

| 5,110,662 | A | 5/1992 | Depauw et al. |
| 5,153,054 | A | 10/1992 | Depauw et al. |
| 5,935,702 | A | 8/1999 | Macquart et al. |
| 5,965,246 | A | 10/1999 | Guiselin et al. |
| 6,210,784 | B1 * | 4/2001 | Rondeau et al. ............. 428/212 |
| 6,572,940 | B1 | 6/2003 | Noethe et al. |
| 7,494,717 | B2 | 2/2009 | Decroupet et al. |
| 2001/0006734 | A1 | 7/2001 | Demiryont |
| 2003/0150711 | A1 | 8/2003 | Laird |

(Continued)

FOREIGN PATENT DOCUMENTS

EP      0877006      11/1998

OTHER PUBLICATIONS

U.S. Appl. No. 12/520,713, filed Jun. 22, 2009, Decroupet, et al.

*Primary Examiner*—Donald Loney
(74) *Attorney, Agent, or Firm*—Oblon, Spivak, McClelland, Maier & Neustadt, L.L.P.

(57) ABSTRACT

Low emissivity glazing which is an assembly of thin layers including at least one metal layer reflecting infrared rays between one or more dielectric layers located between the metal layer and the glass sheet and on the metal layer, the light transmission of one clear float glass sheet 4 mm thick coated with said layers being not less than 83%, the metal layer being selected such that the emissivity is not higher than 0.042.

31 Claims, 1 Drawing Sheet

U.S. PATENT DOCUMENTS

2004/0126591 A1 7/2004 Schicht et al.
2005/0025917 A1 2/2005 Laird et al.
2005/0042460 A1 2/2005 Kriltz
2005/0208281 A1 9/2005 Decroupet et al.
2006/0078747 A1 4/2006 Novis

* cited by examiner

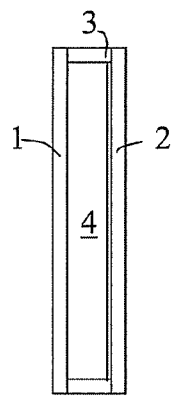
Fig.1
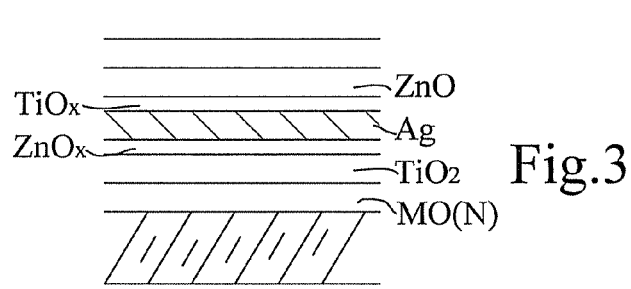
Fig.3
Fig.4
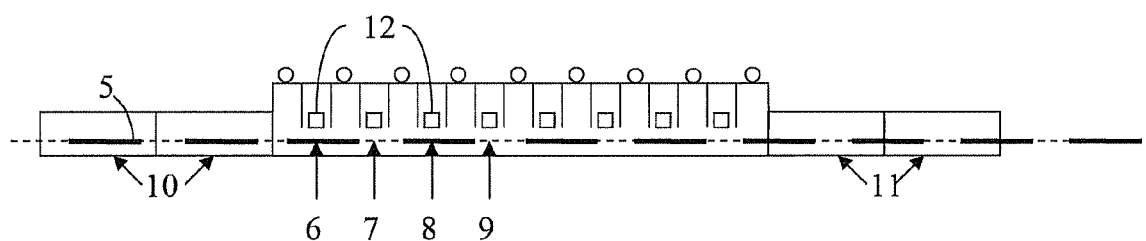
Fig.2

LOW-EMISSIVITY GLAZING

CROSS-REFERENCE TO RELATED APPLICATIONS

This application is the entry into the United States of PCT Application Number PCT/EP2006/060800 filed Mar. 16, 2006 and claims priority from Belgian Patent Application No. 2005/0144 filed Mar. 17, 2005, the entirety of each of which is hereby incorporated by reference.

BACKGROUND

The present invention relates to low-emissivity glazing, that is to say glazing which has the property of reflecting the infrared rays emitted, for example, by the inside of dwellings, and consequently limiting heat loss.

The demand for such glazing is often linked to that of having a light transmission as high as possible. The two demands of low emissivity and high transmission normally result in solutions that are opposing in terms of structure. It is necessary to carry out compromises which are difficult to establish.

The most common practice is to have systems of thin layers that comprise one or more layers capable of reflecting the infrared rays. Systems of this type are in general composed of metal layers, especially a silver layer with a thickness of a few nanometers. The layers must be thin enough not to reduce, in too significant a manner, the visible light transmission. The thickness must also be sufficient to block the transmission of infrared rays, the thickness directly determining the fraction of these rays which are effectively reflected.

The systems applied to glazing must simultaneously fulfill other conditions. Firstly, it is necessary to protect the reflective metallic layers against the chemical or mechanical attacks to which they may be exposed. The metal layers are normally deposited on the glass substrate by vacuum deposition techniques of the magnetically-enhanced sputtering type, more commonly known as magnetron sputtering. The layers obtained by these techniques offer the advantage of a high uniformity of the composition, thickness and surface finish. They are however very fragile and must be protected by additional layers. In a perfectly conventional manner, transparent dielectric layers made from metal oxides and/or nitrides, or else from mixtures of these, offering the required resistance, are used.

Simultaneously, the metal layers must also be protected from a possible diffusion from the substrate, a diffusion which would disadvantageously modify the properties of the reflective metal layer. The nature of the dielectric layers situated between the substrate and the metal layer is often similar to that of the layers located above this same metal layer. It is made from metal oxides and/or nitrides.

Conventionally, the sequence of the layers is composed in the following manner:

glass/dielectric I/metal/dielectric II

Among the most used dielectrics are, especially, ZnO, $TiO_2$, $SnO_2$, $Si_3N_4$, etc. These dielectrics offer various optical properties and are also distinguished by industrial production conditions.

The most common structures also incorporate one particular layer between the metal and the outer dielectric, a layer which has the role of protecting the metal, especially during the deposition of the layer of this dielectric. This is because, usually the formation of this dielectric is carried out in a "reactive" manner. Under these conditions, the dielectric (oxide or nitride) is formed at the same time as the deposition, by reaction of metal vapor emitted by bombardment of a metal cathode, with the atmosphere in which this deposition is carried out being at a very reduced pressure, for an oxide an atmosphere of oxygen or a gas mixture containing oxygen. Under these conditions, the deposited metal layer is in contact with this atmosphere and may be deteriorated, in particular due to the high reactivity of the plasma.

For protection against this deterioration, it is also common to have directly on the metal or suboxidized or nitrided layer reflecting the infrared rays, a so-called "barrier" or else "sacrificial" layer. This is a metal or partially oxidized layer of very small thickness, of which the role is to react with the constituents of the atmosphere which could deteriorate the metal layer that reflects the infrared rays. The barrier layer is carefully chosen both with regard to its nature and its thickness. It is not intended itself to be involved in the reflection of the infrared rays, but to react with the atmosphere in which the dielectric depositions of the layers deposited after that of the metal layer, that reflects the infrared rays, are carried out. To prevent this from substantially reducing the light transmission, it is important to ensure that the barrier layer on the one hand is as thin as possible, but more importantly, on the other hand, that it is practically completely converted into a transparent dielectric during its deposition or deposition operations following its own deposition.

Conventional systems consequently have the following succession of layers:

glass/dielectric I/metal/barrier/dielectric II

Where appropriate, the use of ceramic targets instead of metal targets avoids carrying out a reactive deposition. In other words, the oxide deposition may be carried out in an essentially inert atmosphere (as a general rule having less than 10% oxygen), thus avoiding the risk of oxidation of the previously deposited silver layer. In that case, it is possible to form a multilayer without a barrier layer on top of the silver.

The formation of these assemblies of layers must also result in colors that are satisfactory both in reflection and in transmission. The demand is for the most perfect neutrality possible. In the CIELab calorimetric coordinates, this corresponds to a* and b* values close to zero. Negative values, in particular for b*, are also acceptable. They give the glazing either a blue hue for negative values of b*, or a green hue for negative values of a*. Conversely, it is endeavored to avoid positive values of a*, which would result in purple and brownish hues.

The neutrality of the glazing depends on the choice of the combinations of layers. The layers forming the assemblies in question operate to form an interference system which makes it possible to remove the major part of the undesired wavelengths. The removal of these colors follows a mechanism that is well known in this field. The difficulty is in combining, at the same time, the calorimetric requirements with those linked to the "base" conditions: high light transmission and very low emissivity.

Furthermore, although the principles governing the optical properties of the materials forming the layers are well known, an additional difficulty comes from the techniques for producing this glazing. The deposition conditions, and especially the deposition rate, are dependent on the nature of the materials in question. For an economically acceptable industrial production, the rate must be sufficient. It depends on multiple factors which guarantee the stability of operation over time and over the entire surface of the sheet, and the absence of defects in the layer.

SUMMARY

Although numerous assemblies of layers have been proposed to meet these various requirements, other combinations must be sought in order to comply with the developments of the new demands. To that effect, the regulatory measures which closely follow the progress of the art call for continually improved performances.

Recent regulatory modifications in particular target double glazing which is the usual method for insulating buildings. The performance of this glazing is defined for a composition comprising the use of insulating gas between the two glass sheets of the insulated glazing. The degree of insulation achieved depends on the nature of the gas. Previously, measurements were carried out in a regulatory fashion by taking pure argon as a base.

In practice, it has turned out that it was not possible to guarantee that the glazing thus formed retains a gas composed of 100% argon. Consequently, the performance of glazing, of which approval was established for pure argon, was not ensured.

In order to re-establish a good coherence between the approval criteria and the results expected for commercial products, the certifying bodies have defined new approval conditions in which the performance must be established for an insulating gas composed of 90% argon, the remaining 10% being air. The decrease in the argon content is accompanied by a lower insulation, due to an increase in the heat loss by conduction.

Consequently, to re-establish the glazing performance, the layers used must also be higher performing, especially as regards their emissivity.

By way of indication, the current demand is to obtain a coefficient U at most equal to 1.1 W/m².K under the non-ideal filling conditions indicated above.

The metal layers, as indicated previously, are those which determine the emissivity of the assembly.

Although various metals are named in the literature, practically all the existing products use layers based on silver as a reflective metal. This is because it represents the best compromise in terms of reflection of infrared rays and transparency to the radiation in the visible wavelength and of neutrality of color in transmission and reflection.

Various means have been proposed for ensuring that these silver layers attain the best performances.

Mention may be made, in particular, of the teaching of publication U.S. Pat. No. 5,110,662, belonging to the Applicant, which shows the determining influence of a ZnOx layer laid immediately under the silver layer, and having a well-defined thickness. It should be emphasized that this idea is repeated as a variant in a certain number of later patents or patent applications, such as WO 99/00528.

Various hypotheses have been formulated to explain the mechanism that makes this ZnOx layer improve, under certain conditions, the emissivity and conductivity properties. Among these hypotheses, some relate, for example, to the "attachment" of the silver on the dielectric layer, others the fact that the presence of ZnOx promotes the crystallization of the silver in some systems resulting in fewer grain boundaries, etc.

The conductivity, and consequently the emissivity of the silver layers deposited under industrial conditions have been substantially improved over time, without reaching the ideal values of metallic silver. The choice is obviously to use the layers having the best conductivity and therefore the best emissivity possible. On the basis of the best characteristics of the silver, an additional improvement in the emissivity occurs with the increase in the thickness of the silver layer, all the other characteristics of this layer being kept.

It is perfectly well known that the emissivity decreases when the thickness of the silver increases. Nonetheless, the consequences of this increase in the thickness of the silver are not all favorable. Although the light transmission, within the limits of the normal variations in the thickness of the silver layer, is relatively unaffected, the main difficulty lies in the significant deterioration in the coloring induced, especially in reflection. The glazing in question has a tendency to lose neutrality.

The inventors have consequently endeavored to develop glazing of which the emissivity is further reduced, while retaining the most light transmission possible and an acceptable color neutrality.

The glazing according to the invention is, for this purpose, composed of a succession of layers comprising at least one silver layer with a thickness such that the emissivity of the assembly, for a conventional clear "float" glass of which the transmission for the glass alone TL4 is 90%, is not greater than 0.042, and preferably not greater than 0.038 and particularly preferably not greater than 0.035.

For the glazing according to the invention, obtaining these emissivities may occur through the use of a thicker silver layer. The thickness of silver according to the invention is advantageously at least 12 nm. It does not exceed 18 nm so that the light transmission is kept at least at 83%, still under the same conditions as a 4 mm thick clear glass. Preferably, the thickness of the silver layer is from 12.5 to 16 nm, and more particularly from 12.5 to 14 nm.

The thicknesses indicated relate to the assumed single silver layer. It is possible to replace this layer with two distinct layers separated by one or more dielectric layers. In practice, the division of the silver layer, by multiplying the interfaces, is not the highest-performing solution for obtaining the best emissivity. It may be necessary, for a same emissivity, to slightly increase the overall thickness. The solution consisting in using two silver layers instead of one opens up different possibilities with regard to the adjustment of the interference systems with the dielectric layers to improve the color neutrality, especially in reflection. Insofar as the control of the color neutrality may be obtained without dividing the silver layer, this solution is preferred as it makes it possible to ensure a higher light transmission.

The systems of layers combined with the silver layer of the glazing according to the invention advantageously comprise a barrier layer located immediately on top of the silver. This barrier layer is composed of an oxide or suboxide or nitride of an easily oxidizable or nitridable metal. The barrier layer, after deposition of the upper dielectric, must be as transparent as possible in the visible range, and must not induce undesirable coloring.

The choice of the metal, and of the thickness of the layer, are such that in the completely oxidized or nitrided state, the decrease in the transmission caused by this barrier remains below 3%, and preferably below 1.5%. Conventionally, the metals used to form these barriers are: Ti, Zr, Al, Ni, Fe, Cr, Zn, Nb, Ta, Sn, In and combinations thereof. Preferably, the barrier is composed of titanium, at least partially oxidized. The titanium oxide offers the advantage of having a high transparency.

The thicknesses of the barrier layers do not, as a general rule, exceed 5 nm, and preferably lie within 1 to 4 nm and particularly 1 to 3 nm.

The assemblies of layers according to the invention preferably comprise a zinc oxide or suboxide layer, ZnOx, onto which the silver layer is directly applied. As indicated previously, the presence of this zinc oxide or suboxide layer contributes to the improvement in the performances of the silver layer. This improvement is in particular expressed by a lower emissivity for the same thickness of silver.

The zinc oxide or suboxide layer is preferably at least 3 nm thick, which corresponds in the industrial installations to the use of a single cathode. This thickness is furthermore limited to that which appears useful for promoting the performances of the silver layer. The thickness of this layer advantageously does not exceed 15 nm. It is advantageously at most 10 nm, and preferably from 3 to 8 nm.

The interference systems which make it possible to "neutralize" the color in reflection result in having at least one layer with a relatively high refractive index under the silver layer, apart from the zinc oxide layer in question above, and layers with a lower refractive index on top of this same silver layer or, on top of the barrier layer located on top of the silver layer.

According to the invention, in order to obtain the highest possible light transmission, the interference system of the dielectric layers comprises, between the glass sheet and the metal layer, an assembly of at least three dielectric layers, including one optionally substoichiometric zinc oxide layer, a layer located immediately under the metal layer, and at least two metal oxide, nitride or oxynitride layers of which the refractive indices are greater than that of the glass sheet.

The choice of the dielectric layers must not only correspond to the index conditions, making it possible to reduce the reflection as much as possible in the visible range, without impairing the neutrality, whether in reflection or in transmission, but also this choice of layers must result in an absorption that is as low as possible. These layers must also be perfectly compatible with the layers with which they are in contact, and especially be relatively easy and economic to produce industrially in the conventional installations.

Among the candidates for the dielectric layers located under the silver, the oxides of titanium, bismuth or niobium have, in particular, been proposed in the prior art. Among these, titanium oxide $TiO_2$ is particularly advantageous insofar as it offers a high refractive index with a very low absorption in the visible range so long as it is deposited under strictly controlled conditions. One difficulty linked to the use of this oxide remains however, its deposition rate.

It is the inadequacy of the deposition rate which has for a long time, in practice, resulted in titanium oxide only being used for small-thickness layers, even though the advantage of thicker layers was evident.

The formation of an assembly of layers is carried out industrially in a succession of chambers that connect to one another, each chamber being the site of one or more depositions corresponding to one or more cathodes. The glass to be coated passes continuously into the assembly of chambers. The traveling rate under each cathode is therefore necessarily the same for all the depositions carried out. Consequently, the thickness of the deposit depends directly on the deposition speed specific to each constituent, which itself depends on the applied voltage, the nature of the cathode, the optional reaction with the atmosphere and consequently the nature of the latter, etc. These parameters cannot all be modified at will. In particular, reactions at the surface of the cathodes often result in having to limit the rate of formation to prevent, for example, the appearance of arcs between the cathode and the substrate.

A few years ago, the development of new "magnetron sputtering" techniques made it possible to significantly increase the deposition rate of certain compounds such as titanium oxide or silicon nitride. Such a development is reported, for example, in the publication "Glas Ingenieur (Glass Engineer)", 7 (1997). Nevertheless, certain compounds, including titanium oxide, remain difficult to produce with all the homogeneity and reproducibility required when the deposition rate is increased too radically. Although it is necessary to prevent the multiplication of cathodes and targets in the installation, and also avoid the multiplication of deposition chambers, it is preferable to keep the thickness of the layers, such as those of titanium oxide, within certain limits.

By way of indication, when, in order to obtain large thicknesses of titanium oxide without increasing the number of cathodes, while keeping the same production rate, the deposition conditions are forced, substantial variations in thickness may appear reaching relative values of 8% or more. Variations of this size are incompatible, for example with the qualities required in terms of uniformity of coloration. In practice, the variations of thickness must be kept as low as possible, and not exceed 3%, and preferably remain below 2%. For these reasons, it is preferable, as indicated later on, to limit the thickness of the titanium oxide layers used.

The optical filter formed by the silver layer and the assembly of dielectric layers requires a certain optical path, in other words a certain value of the geometric thickness of each layer multiplied by the index of this layer (th×n). For the thicknesses of silver considered according to the invention, the optical paths of the assembly of layers located respectively under and on top of the silver are from 50 to 90 nm underneath and from 70 to 110 nm above. Preferably, these optical paths which make it possible to attain neutrality both in reflection and in transmission, are from 55 to 80 nm under the silver and from 75 to 100 nm above the silver.

To obtain an adequate optical path under the silver layer, it is necessary to ensure that the titanium oxide layer has a thickness which is not less than 6 nm and preferably not less than 10 nm. Conversely, the thickness of this layer is advantageously less than 16 nm. The preferred thickness is from 12 to 15 nm.

The titanium oxide obtained by reactive deposition has a refractive index, for a wavelength of 550 nm, which is not usually greater than 2.6, and usually lies between 2.35 and 2.5 depending on the deposition conditions, the highest indices being obtained for the deposition rates that are also the highest.

The zinc oxide or suboxide layer located under the silver, as indicated previously, is advantageously limited to the thickness which makes it possible to most improve the properties of the silver layer on which it is superposed. The total optical path may advantageously be adjusted by introducing an additional layer of which the deposition conditions are less restrictive than those regarding titanium oxide. According to the invention, the optical path under the silver is advantageously adjusted by introduction of at least one metallic oxide or nitride or oxynitride MO(N) layer with a refractive index intermediate between that of the glass and that of the titanium oxide.

The introduction of an additional layer also has the advantage of having an influence on the behavior of the silver layer. Specifically, it is observed that the multiplicity of interfaces between the layers located between the glass substrate and the silver layer has a tendency to minimize the sensitivity of the silver to the age of the glass or to the preparation of the surface of the latter. These factors, which are difficult to analyze, are nevertheless significantly involved in the properties obtained. Any element which makes it possible to reduce their negative influence is therefore appreciable. In this sense, the presence of additional interfaces comprises advantageous aspects.

Preferably, the additional layer is a layer of an oxide or nitride or else oxynitride of a metal from the group comprising zirconium, zinc optionally comprising aluminum, or a mixture based on titanium and one of the metals of the group comprising aluminum, tin, zinc, indium, hafnium, antimony and zirconium.

The choice of the nature of the additional layer is a function of several factors. In particular, it is important in practice that the installations used are implemented easily for obtaining these successions of layers. On this subject, it is necessary to emphasize the particular difficulty that exists for certain installations in managing to juxtapose the extremely different deposition conditions considering the specificities of the cathodes used.

It is common, for example, to deposit titanium oxide in an atmosphere containing very little oxygen. This way of proceeding is necessary to prevent the formation of an oxide layer on the metal cathode, a contamination which considerably reduces the deposition rate. The titanium oxide may advantageously, for this reason, be deposited from a ceramic target (based on titanium oxide). Conversely, for example, the deposition of zinc oxide or suboxide is carried out with an atmosphere that is richer in oxygen if it is desired to avoid a significant light absorption. Considering these constraints, passing from one zinc oxide deposition station to a titanium oxide deposition station requires a compartmentalization that all the installations cannot provide perfectly. For this reason, in those of the installations for which the compartmentalization of the stations is likely to raise difficulties, it is preferable, according to the invention, to choose layers of which the depositions are carried out under conditions, especially atmospheric conditions, which are compatible with one another.

One advantage of layers based on zirconium, or those formed from an alloy based on titanium and aluminum or on another of the metals from the group indicated above, is that they are deposited under atmospheric conditions that do not fundamentally differ from those used for depositing the titanium oxide layer.

All the layers indicated above have a refractive index which lies between that of the substrate and that of the titanium oxide. For example, the zinc oxide, even containing a small proportion of aluminum, is of the order of 1.9 to 2. That of the zirconium oxide is close to 2.1 to 2.2. For the mixed oxides based on titanium and on another metal, the index depends on the proportion of the latter contained in the alloy. The preferred alloys have an index between 2.1 and 2.3 corresponding, for an alloy based on titanium and aluminum, for example, to percentages of aluminum which may range up to 50% aluminum, and which are preferably between 10 and 30% by weight in the target, a proportion which remains approximately the same in the deposited layer.

The succession of layers comprising an increasing index is particularly preferred. It corresponds to the most advantageous results in terms of neutrality and visible light transmission. For this reason, one advantageous sequence is the following:

glass/MO(N)/titanium oxide/zinc oxide/silver/ . . .

Nevertheless, the sequence inverting the oxide layers may be preferred in some cases for reasons of ease of use in the installation, leading to the sequence:

glass/titanium oxide/MO(N)/zinc oxide/silver/ . . .

In such a sequence according to the invention, MO(N) is not the zinc oxide, of which it was said above that its thickness under the silver did not exceed 15 nm.

The thicknesses of the MO(N) layer are adjusted as a function of the required optical path. Considering the other layers present under the silver, the thickness of the layer is advantageously from 3 to 14 nm, and preferably from 4 to 10 nm for the layers of which the index is greater than 1.9, preferably greater than 2.1, and particularly preferably greater than 2.2.

In order to form a satisfactory interference filter, the dielectrics located above the barrier layer conventionally form an assembly which, in addition to properties resulting in the establishment of the satisfactory interference filter, offers suitable protection of the silver layer both from a chemical and mechanical point of view.

For their ease of deposition combined with good light transmission, preferred dielectric layers located on top of the silver are based on oxides of zinc, tin, indium, mixtures of these oxides or nitrides such as those of silicon or aluminum and also mixtures thereof.

It is common to combine, where appropriate, several layers of different natures to take into account the specificities of each. Thus the zinc oxide widely used due to its relatively easy formation, has the drawback of offering a low chemical resistance due to the "column" structure which it tends to develop when its thickness is insufficient. This columnar growth facilitates the penetration of moisture and chemical agents within the layer in the direction of the silver layer.

For this reason, although the use of a zinc layer is common, it is generally combined with a substantially more "compact" layer blocking the chemical agents. A layer based on tin oxide or indium oxide, optionally doped, or else a layer of silicon nitride is advantageously introduced into the system of layers located on top of the silver.

One particularly advantageous combination is composed of the following assembly located on top of the silver:

. . . /silver/barrier/ZnO/SnO$_2$ . . .

Considering the respective indices (preferably less than or equal to 2) of the layers located on top of the silver, the sum of the physical thicknesses is between 35 and 60 nm, and preferably between 40 and 50 nm in order to result in an adequate optical path.

The system of layers of the glazing according to the invention may also comprise a surface layer chosen to particularly offer a high mechanical strength. Titanium oxide layers have been proposed in the prior art for this purpose. They may be used within the scope of the glazing according to the invention. Nevertheless, the high index of the titanium oxide layers means that it is preferable to substitute them with other layers, in particular silicon oxide layers, which in addition to their hardness have a very low index which contributes to the development of the appropriate interference system.

Since the hard surface layer essentially has a mechanical protection role, its thickness is limited to that which proves effective in this field. The thickness will not, as a general rule, be greater than 15 nm. When silicon oxide is chosen, the difficulty of producing this type of layer preferably results in not exceeding a thickness of 12 nm.

In order to meet the demands of the users, it is advisable not only to improve the emissivity while maintaining the light transmission, it is also necessary that the glazing according to the invention remains neutral, in particular, in reflection.

A glass sheet according to the invention comprises an assembly of layers as indicated previously, and of which the respective thicknesses of silver and of the dielectrics are chosen so that the values of the CIELab calorimetric coordinates under illuminant D65 are established in reflection at:

$$-4<a^*<0.5 \text{ and } -14<b^*<1$$

and preferably at:

$$-3<a^*<0 \text{ and } -12<b^*<0.$$

In transmission, good yield of the colors is essential. For this reason, a stricter neutrality is required. Preferably, the same thicknesses of silver and of the dielectrics are chosen so that the calorimetric coordinates in the CIELab system are established at:

$$-4<a^*<0 \text{ and } b^*<4$$

and preferably at:

$$-3<a^*<0 \text{ and } b^*<3.$$

The important point for the light transmitted is not to have a pronounced yellow coloring, in other words that $b^*$ is not too positive.

The invention also relates to double glazing composed using two sheets of glass of which one bears the assembly of layers indicated previously. In this double glazing, the layers are advantageously deposited in the position turned toward the space between the two sheets, and more particularly in position 3 according to the conventional designation, that is to say on the glass sheet in contact with the interior atmosphere and on the face of this inside the double glazing. The double glazing according to the invention advantageously meets the conditions of neutrality obtained as before by adjusting the thicknesses of layers within the limits indicated regarding the emissivity and light transmission characteristics, so that the calorimetric coordinates in external reflection in the CIELab system are established at:

$$-3<a^*<0 \text{ and } -8<b^*<0$$

and preferably:

$$-2<a^*<0 \text{ and } -6<b^*<-2$$

Through the choice of the nature and of the thickness of the dielectric layers situated under and on top of the silver, the double glazing according to the invention also advantageously has, for two sheets of clear float glass, of which the transmission without layers is established at 82%, a light transmission which is not less than 73%, and preferably not less than 75%. The transmission for this double glazing may advantageously be greater than 76%.

BRIEF DESCRIPTION OF THE FIGURES

Other features and advantages of the invention will appear on reading the detailed description which follows, for the understanding of which reference will be made to the appended drawings among which:

FIG. 1 schematically represents a cross-sectional view of an insulating double glazing;

FIG. 2 schematically represents a vacuum deposition installation for forming the systems of layers according to the invention;

FIG. 3 schematically represents a cross-sectional view of a sheet coated with a system of layers according to the invention; and FIG. 4 represents a cross-sectional view of a glass sheet coated with another system of layers according to the invention.

DETAILED DESCRIPTION

The insulated glazing shown schematically in FIG. 1 is conventionally composed of two glass sheets 1 and 2, respectively in contact with the outside atmosphere, and with the inside of the dwelling. The two glass sheets delimit, in cooperation with a seal 3 which is impermeable to gases, located at the periphery of the glazing between the two sheets, a space 4. The space 4 is advantageously filled with an insulating gas such as argon.

The gas trapped in the glazing significantly contributes to the performance of the glazing. For this reason, it is important on the one hand to ensure a good "filling" at the time of manufacture, in other words to ensure that all the ambient air is completely evacuated and replaced with the insulating gas, but also, on the other hand, to guarantee that the leaktightness is sufficient and makes it possible to prevent the gas trapped from escaping or diffusing over time.

The low-emissivity system of layers is normally deposited on the face 3 of the double glazing (the numbering of the faces begins with the face turned toward the outside). In this arrangement, the layers are protected against mechanical impairment. They are also shielded from chemical attack. The position on face 3 is preferred to that on face 2 for the optical-energy properties obtained. This position is more favorable to the penetration of solar energy.

The glass sheets forming this glazing may be identical or different, both in composition and in thickness. The sheets may also be composed of a single glass sheet, or from a laminated assembly, that is to say joining several assembled sheets using intermediate plastic sheets such as PVB (polyvinyl butyral). The characteristics of the glazing according to the invention are given in the present application, for 4 mm thick clear float glass substrates. These conditions are chosen as being particularly representative of the widest proportion of commercial insulating glazing. Corresponding to the latter are also the best performances as regards the overall light transmission.

The assemblies, of which the characteristics are given in the examples, are of two glass sheets separated by a 15 mm gap filled with argon. In practice, the proportion of argon in the double glazing is not less than 85%, and preferably is greater than 90%.

Although the transmission of the glass alone is not negligible, a 4 mm thick clear glass sheet transmitting around 90% of the incident visible radiation, and a single double glazing a little bit more than 80%, the presence of a specially adapted low-emissivity system of layers, as provided by the invention, limits the reduction of transmission by only a few percent. Obviously, if the glazing must simultaneously fulfill additional functions, for example soundproofing or resistance to break-ins, the presence of thicker glass and/or synthetic intermediate sheets, results in a decrease of the light transmission. Nevertheless, in these cases the choice of a system of layers according to the invention makes it possible to limit the loss of transmission associated with the low-emissivity character of this glazing.

The installations for producing layers that make up these systems may differ from one to another, especially depending on the manufacturer in question. Their operating principle remains the same. It is a deposition carried out under vacuum by sputtering.

A schematic representation of this type of installation is given in FIG. 2. In these installations, the glass sheets 5 borne by conveyors, advance into a succession of chambers 6, 7, 8, 9 in which a partial vacuum is maintained. Air locks 10, 11 allow the sheets to enter and exit without breaking the vacuum that exists in the deposition chambers.

The targets 12, usually metallic (for a sufficient deposition rate), fixed to cathodes are bombarded by the ions of the inert gas, under the effect of an intense electric field. The metal atoms lifted from a target are condensed on the glass sheet. The addition of oxygen or nitrogen in the atmosphere of the chamber allows a "reactive" oxide or nitride or oxynitride deposition.

The mechanisms developed, especially at the level of the cathode, and the differences in reactivity of the materials result in extremely variable deposition rates depending on the metals in question. The rate may be adjusted as a function of certain parameters such as the applied voltage or the precise composition of the atmosphere in each chamber or else the flow rate of the gases admitted into these chambers. In any case, overall, the nature of the metal remains a determining factor for the deposition rate which may be achieved. By way of indication, although zinc or tin oxide layers are relatively easy to deposit, in comparison titanium oxide is a lot less. The ratio of the deposition rates may reach 10/1. The most recent techniques have enabled this ratio to be reduced, however it remains significant.

In order to form the layers of the complete system, the chambers contain, in their succession, the various metals required. The atmospheres of each chamber may also be chosen in a distinct fashion, the deposition of a metal thus possibly, for example, being followed by that of an oxide or vice-versa with the limits that impose the contiguity of different atmospheres for metals that are also different, when a perfect compartmentalization cannot be ensured.

The economics of this type of deposition impose that the assembly of layers is carried out during a single passage of the sheets in the installation. Considering the differences in the deposition rates and the different thicknesses of each layer, it is necessary for some of them to multiply the targets in order to reach the required thicknesses. This requirement is especially displayed with regard to the deposition of certain constituents such as titanium oxide.

It is clearly understood that the production cost is a function of the investment necessary for this type of installation, and the multiplication of the targets and of the chambers for the most difficult metals, leads to an increase in the cost of this investment but also in the operating cost of these installations. Any measure which makes it possible to operate more rapidly is therefore advantageous. It is an objective of the invention to enable this improvement without the properties of the glazing being compromised.

FIG. 3 schematically shows a glass sheet 12 coated with a system of layers according to the invention.

Successively, starting from the substrate, the following sequence of layers is deposited:

MO(N)/titanium oxide/zinc oxide/silver/titanium oxide/zinc oxide (equivalent zinc oxide)

FIG. 4 is similar to the previous one. The MO(N) and titanium oxide layers are reversed.

The properties of the assemblies according to the invention appear in the table below. The values of the transmission LT and the calorimetric coordinates in reflection a* and b* are first given for the single sheet bearing the assembly of layers, and then for a double glazing comprising this single sheet. The sheets of clear glass each have a thickness of 4 mm. In the double glazing, the 15 mm space between the two sheets is filled with argon. The layers are in position 3.

In a first series, the thickness of silver is adjusted to 130 Å so as to attain the coefficient U of 1.1 W/m$^2$.K. The silver is deposited on a zinc oxide ZnOx layer of 40 Å. The silver is covered with a titanium oxide barrier layer of 25 Å.

Under the ZnOx layer, and directly in contact with it, is a TiO$_2$ layer, of which the refractive index at a wavelength of 550 nm, under the deposition conditions, is 2.37.

The dielectrics located on top of the silver are represented by their equivalent thickness in ZnO. The dielectrics in question, as indicated previously, in practice are usually composed of several layers, of which the outermost is chosen so as to offer good mechanical strength and chemical resistance.

The results of coloration in reflection are given for various MO(N) layers located on the glass.

All the thicknesses of the layers are expressed in Ångströms.

The double glazing obtained (second line in the table for each assembly of layers) corresponding to the characteristics of the invention, offers a coefficient U of 1.1 W/m$^2$.K, corresponding to an emissivity of 0.038, with high light transmissions in the visible range, and neutral to bluish colorations.

| MO (N) | TiO$_2$ | ZnOx | Ag | TiOx | eqv ZnO | a* | b* | LT |
|---|---|---|---|---|---|---|---|---|
| ZnO | 145 | 120 | 40 | 130 | 25 | 470 | −1.07 | −13.92 | 85.5 |
|  |  |  |  |  |  |  | −1.30 | −8.14 | 77.2 |
| ZnO | 145 | 120 | 40 | 130 | 25 | 460 | −0.53 | −13.81 | 86.0 |
|  |  |  |  |  |  |  | −0.99 | −7.88 | 77.7 |
| ZnO | 145 | 120 | 40 | 130 | 25 | 450 | −0.09 | −13.59 | 86.5 |
|  |  |  |  |  |  |  | −0.66 | −7.57 | 78.1 |
| ZrO$_2$ | 120 | 120 | 40 | 130 | 25 | 470 | −0.96 | −13.39 | 86.2 |
|  |  |  |  |  |  |  | −1.21 | −7.63 | 77.8 |
| TiAlOx n = 2.27 | 100 | 120 | 40 | 130 | 25 | 460 | −1.41 | −11.66 | 86.3 |
|  |  |  |  |  |  |  | −1.43 | −6.53 | 77.9 |
| TiAlOx n = 2.17 | 120 | 120 | 40 | 130 | 25 | 465 | −1.28 | −12.11 | 86.1 |
|  |  |  |  |  |  |  | −1.37 | −6.86 | 77.7 |

Another series of tests was carried out, this time with a slightly thicker silver layer with the assemblies indicated in the following table. The indices of the TiSnOx and TiInOx layers were respectively 2.22 and 2.24 for the materials thus deposited.

The emissivity of the two assemblies below were established respectively at 0.033 and 0.034.

| MO (N) | | TiO$_2$ | ZnOx | Ag | TiOx | eqv ZnO | a* | b* | LT |
|---|---|---|---|---|---|---|---|---|---|
| TiSnOx | 65 | 140 | 40 | 145 | 25 | 450 | 0.47 | −11.21 | 85.6 |
| n = 2.22 | | | | | | | −0.50 | −6.58 | 77.3 |
| TiInOx | 60 | 140 | 40 | 142 | 25 | 460 | 0.08 | −11.33 | 85.7 |
| n = 2.24 | | | | | | | −0.80 | −6.70 | 77.4 |

Tests similar to the preceding ones were carried out by changing the respective positions of the TiO$_2$ and MO(N) layers in the multilayer, all the other conditions remaining the same. The results in this case are slightly modified as regards the optical aspects. The results appear in the table below:

| TiO$_2$ | MO (N) | | ZnOx | Ag | TiOx | eqv ZnO | a* | b* | LT |
|---|---|---|---|---|---|---|---|---|---|
| 110 | ZrO$_2$ | 100 | 40 | 130 | 25 | 460 | −0.77 | −13.70 | 85.7 |
| | | | | | | | −1.13 | −7.91 | 77.4 |
| 120 | TiAlOx | 100 | 40 | 130 | 25 | 460 | −0.78 | −12.24 | 86.4 |
| | n = 2.27 | | | | | | −1.10 | −6.84 | 78.0 |
| 110 | TiAlOx | 120 | 40 | 130 | 25 | 475 | −0.94 | −13.51 | 85.4 |
| | n = 2.17 | | | | | | −1.24 | −7.93 | 77.2 |

The invention claimed is:

1. A low-emissivity glazing comprising:
a glass sheet; and
an assembly of layers coated on the glass sheet including:
   at least one metal layer that reflects infrared rays;
   a first sub-assembly of at least three dielectric layers located between the metal layer and the glass sheet, said first sub-assembly including:
      a first dielectric layer comprising zinc oxide and located immediately under the metal layer,
      a second dielectric layer comprising metal oxide, nitride, or oxynitride having a refractive index greater than 1.9,
      a third dielectric layer comprising metal oxide, nitride, or oxynitride having a refractive index greater than 1.9; and
   a second sub-assembly of layers on a side of the metal layer opposite the first sub-assembly of layers, said second sub-assembly including:
      a fourth dielectric layer,
   wherein, when the glass sheet is a clear float glass sheet with a thickness of 4 mm the low emissivity glazing has a visible light transmission at least equal to 83%, and wherein the emissivity of the coated glass sheet is not greater than 0.042.

2. The glazing as claimed in claim 1, wherein the emissivity is not greater than 0.038.

3. The glazing as claimed in claim 1, wherein the emissivity is not greater than 0.035.

4. The glazing as claimed in claim 1, wherein the metal layer is a silver layer having a thickness at least equal to 12 nm.

5. The glazing as claimed in claim 4, wherein the thickness of the silver layer is not greater than 18 nm.

6. The glazing as claimed in claim 5, wherein the thickness of the silver layer is from 12.5 to 16 nm.

7. The glazing as claimed in claim 4, wherein the optical path of the first sub-assembly of layers is from 50 to 90 nm, and the optical path of the second sub-assembly of layers located above the silver layer is from 70 to 110 nm.

8. The glazing as claimed in claim 7, wherein the optical path of the first sub-assembly of layers is from 55 to 80 nm, and the optical path of the second sub-assembly of layers is from 75 to 100 nm.

9. The glazing as claimed in claim 4, wherein the color in reflection, expressed in the CIELab coordinates, is −4<a*≦0.5 and −14<b*≦1.

10. The glazing as claimed in claim 9, wherein the color in reflection is −3<a*≦0 and −12<b*≦0.

11. The glazing as claimed in claim 1, wherein the metal layer is a silver layer.

12. The glazing as claimed in claim 11, wherein the first dielectric layer has a thickness which is not greater than 15 nm.

13. The glazing as claimed in claim 12, wherein the thickness of the first dielectric layer is between 3 and 8 nm.

14. The glazing as claimed in claim 1, wherein the metal layer comprises silver, the second sub-assembly of layers further comprising:
   a barrier layer superposed directly on the metal layer, said barrier layer formed from a metal oxide or nitride, the metal in said barrier layer being from the group comprising: Ti, Zr, Al, Ni, Fe, Cr, Zn, Nb, Ta, In and mixtures thereof.

15. The glazing as claimed in claim 14, wherein the thickness of the barrier layer is at most equal to 5 nm.

16. The glazing as claimed in claim 15, wherein the thickness of the barrier layer is at most equal to 4 nm.

17. The glazing as claimed in claim 1, wherein the second and third dielectric layers have refractive indices greater than that of the glass sheet, the second dielectric layer is farther from the glass sheet than the third dielectric layer, and the second dielectric layer has a higher refractive index than the third dielectric layer.

18. The glazing as claimed in claim 17, wherein the metal layer comprises silver, the third dielectric layer has a refractive index between 1.9 and 2.3, and the second dielectric layer comprises titanium oxide and is deposited on the third dielectric layer.

19. The glazing as claimed in claim 18, wherein the third dielectric layer is deposited on the glass and is made from zirconium, zinc optionally as an alloy with aluminum, or from an alloy based on titanium and on a metal from the group comprising aluminum, tin, zinc, indium, hafnium, antimony and zirconium.

20. The glazing as claimed in claim 1, wherein the second and third dielectric layers have refractive indices greater than that of the glass sheet, the second dielectric layer located under the first dielectric layer and being an oxide, nitride or oxynitride layer of zirconium or of an alloy based on titanium and on a metal from the group comprising aluminum, tin, zinc, indium, hafnium, antimony and zirconium.

21. The glazing as claimed in claim 20, wherein the third dielectric layer is in contact with the glass sheet and is a titanium oxide layer.

22. The glazing as claimed in claim 19, wherein the third dielectric layer has a thickness of 3 to 10 nm.

23. The glazing as claimed in claim 22, wherein the third dielectric layer has a thickness from 4 to 8 nm.

24. The glazing as claimed in claim 18 wherein the second dielectric layer has a thickness greater than 12 nm and less than 16 nm.

25. The glazing as claimed in claim 24, wherein the second dielectric layer has a thickness of 10 to 15 nm.

26. A glazing comprising:
a first glass sheet coated according to claim 1;
a second glass sheet; and
a space provided between the first and second glass sheets containing an atmosphere composed of at least 85% argon.

27. The glazing as claimed in claim 26, wherein when the first and second glass sheets are 4 mm thick clear float glass sheets, the visible light transmission is not less than 73%, and preferably is not less than 75%.

28. The glazing as claimed in claim 26, wherein in reflection, the colorimetric coordinates in the CIELab system are established at: $-3<a^*<0$ and $-8<b^*<0$.

29. The glazing as claimed in claim 1, wherein the zinc oxide is sub-stoichiometric.

30. The glazing as claimed in claim 18, wherein the second or third dielectric layer has a refractive index between 2.1 and 2.3.

31. The glazing as claimed in claim 1, wherein the low emissivity glazing has a visible light transmission of at least 85%.

\* \* \* \* \*